United States Patent [19]

Menders et al.

[11] Patent Number: 5,731,585

[45] Date of Patent: Mar. 24, 1998

[54] VOIGT FILTER

[75] Inventors: James H. Menders; Eric J. Korevaar, both of San Diego, Calif.

[73] Assignee: ThermoTrex Corporation, San Diego, Calif.

[21] Appl. No.: 935,899

[22] Filed: Aug. 27, 1992

[51] Int. Cl.$^6$ .............................. G02B 27/28; H04K 1/00
[52] U.S. Cl. .......................... 250/382; 359/281; 359/283; 359/498; 356/367; 356/368
[58] Field of Search ........................ 359/280, 281, 359/282, 283, 494, 496, 497, 498; 312/312, 368, 366, 367; 250/382

[56] References Cited

U.S. PATENT DOCUMENTS

| 3,129,410 | 4/1964 | Sorokin | 359/281 |
|---|---|---|---|
| 3,165,705 | 1/1965 | Dicke | 356/367 |
| 3,353,097 | 11/1967 | Johnson | 359/281 |
| 3,466,565 | 9/1969 | Rigrod | 359/281 |
| 3,491,286 | 1/1970 | Simpson | 359/281 |
| 3,693,082 | 9/1972 | Jaecklin | 356/368 |
| 3,936,748 | 2/1976 | Bomke | 359/281 |
| 3,938,877 | 2/1976 | Strumia et al. | 359/497 |
| 3,942,890 | 3/1976 | Malone . | |
| 4,035,083 | 7/1977 | Woodriff et al. | 356/367 |
| 4,298,284 | 11/1981 | Yamamoto et al. | 356/368 |
| 4,339,201 | 7/1982 | Yasuda et al. | 356/312 |
| 4,341,470 | 7/1982 | Parker et al. | 356/312 |
| 4,498,774 | 2/1985 | Yeung et al. | 356/368 |
| 4,504,145 | 3/1985 | Koizumi | 356/368 |
| 4,983,844 | 1/1991 | Korevaar . | |

FOREIGN PATENT DOCUMENTS

| 52-60675 | 5/1977 | Japan | 359/281 |

OTHER PUBLICATIONS

Pochi Yeh, Dispersive Magneto-optics Filters 1 Jun. 1982/vol. 21, No. 11/Applied Optics.
PP Sorohin et al, Frequency-Locking of Organic Dye Lasers to Atomic Resonance Lines; vol. 15 No. 6 Applied Physics Letters 15 Sep. 1969.
McGraw-Hill; Dictionary of Scientific and Technical Terms pp. 1591 and 532.

*Primary Examiner*—Nelson Moskowitz
*Attorney, Agent, or Firm*—Fish & Richardson P.C.

[57] ABSTRACT

A Voigt optical filter. Crossed polarizers are provided at the entrance and exit of a vapor cell continuing an alkali metal vapor. A magnet provides a magnetic field at 90° with the axis of the cell and 45° with each polarizer direction. The only light which passes through the filter is light within a narrow frequency band near the atomic transitions (absorption peaks) of the alkali metal vapor.

1 Claim, 3 Drawing Sheets

VOIGT FILTER

The present invention relates to optical filters and especially to polarizing optical filters.

BACKGROUND OF THE INVENTION

Laser communications and sensing systems are often required to operate in the presence of high background noise. Examples include any system intended for daytime operation. To increase signal to background ratios for these optical systems, designers may either increase laser power or improve the out-of-band noise rejection in the optical receiver. Ideally, the out-of-band rejection would be provided by a bandpass optical filter which is opaque across the receiver response spectrum except for a bandpass just wide enough to match the laser spectrum. What's more, the background noise rejection could be further improved by using the narrowest laser linewidth possible with a corresponding filter. In practice however, multi-layer dielectric interference filters with a bandwidth of >1 nm have normally been used. Since laser linewidths 1,000 times narrower are available, improvement of background rejection one thousand-fold is feasible if filters matching the lasers can be provided.

"Atomic line filters (ALFs)" with passbands of about 0.001 nm have been developed to improve the background rejection of conventionally filtered laser receivers. In general, these filters make use of narrow, sharp features in the spectra of atomic vapors to provide ultra-narrow optical passbands. One type of ALF makes use of the sharp absorption lines of alkali metal vapors. A review of these absorption-re-emission ALFs is given by Jerry A. Gelbwacks, IEEE J. Quantum Electron, 24 (7), 1266 (1988). These filters were typically slow since they operated on this absorption-re-emission principal. Efforts have been made to speed up the process. A relatively fast ALF operating on an absorption ionization principle is described in U.S. Pat. No. 4,983,844 granted to Dr. Korevaar (one of the present inventors).

A second type of atomic line filter is the Faraday filter. A good theoretical treatment of the Faraday filter was given by Pochi Yeh in Appl. Opt. 21 (11), 2069 (1982). This filter is based on the Faraday effect discovered by Michael Faraday in 1845. The Faraday effect refers to the rotation of polarized light when it passes through a medium in the direction of an applied magnetic field. The amount of rotation is proportional to the magnetic field strength and the distance the light travels through the medium. When the medium is an atomic vapor, that effect occurs over a very narrow range of frequencies. This effect has been used to make narrow band filters for at least 20 years. Basically, a light beam is directed along the axis of a cell containing an alkali metal vapor. Crossed polarizers are provided at opposite ends of the cell and a magnetic field is applied in the direction of the beam. The crossed polarizers stop all light in the beam except light at wavelengths in the vicinity of the atomic transition which passes the first polarizer and is rotated 90° inside the cell to pass the second polarizer.

In 1902 (57 years after the discovery of the Faraday effect) W. Voigt discovered that when a strong magnetic field is applied to a vapor in a direction perpendicular to a beam of light passing through the vapor, double refraction or birefringence takes place. This phenomenon is now known as the "Voigt effect" or "magnetic double refraction." The magnetically induced birefringence generally has the effect of transforming linearly polarized light into elliptically polarized light as follows: If linearly polarized light is incident on the vapor it will be broken into two orthogonal components, one perpendicular to the magnetic field and one parallel to it. These components have different refractive indices and therefore different phase velocities. As a result one component gets ahead of the other and elliptically polarized light emerges.

The "Faraday effect" has been recognized primarily as a method for rotation of the polarization of a beam of linearly polarized light. The "Voigt effect" on the other hand (although similar in some respects) is recognized as an effect which produces "double refraction". See the McGraw-Hill Dictionary of Scientific and Technical Terms.

Faraday filters based on the principles of the Faraday effect have provided a substantial improvement in the performance of atomic line filters. Additional advantages would be realized if a filter could be provided based on the optical principles of the Voigt effect. Such a filter would be more compact and the filter could be easily designed for use with a permanent magnet.

SUMMARY OF THE INVENTION

The present invention provides a Voigt optical filter. Crossed polarizers are provided at the entrance and exit of a vapor cell continuing an alkali metal vapor. A magnet provides a magnetic field at 90° with the axis of the cell and 45° with each polarizer direction. The only light which passes through the filter is light within a narrow frequency band near the atomic transitions (absorption peaks) of the alkali metal vapor.

DETAILED DESCRIPTION OF PREFERRED EMBODIMENTS

Figure 1:
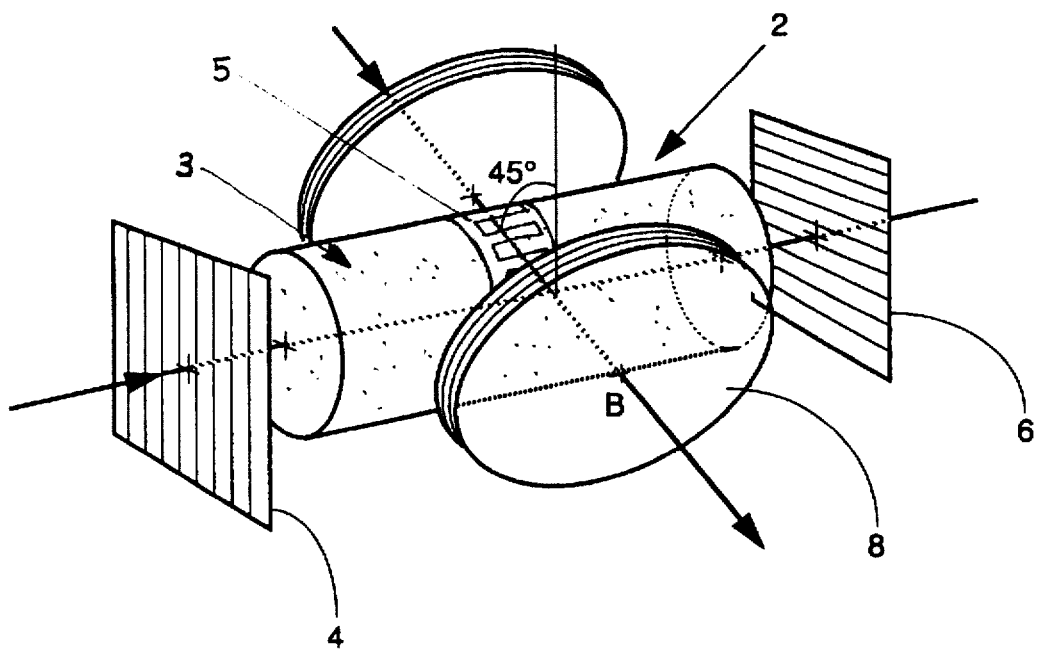
FIG. 1 is a schematic drawing of an optical filter.

A preferred embodiment of the Voigt filter (present invention) can be described by reference to FIG. 1.

This filter includes a vapor cell 2 in which cesium vapor 3 is contained and maintained at a temperature of about 100° C. with heating element 5. A magnetic field of 100 gauss in the vapor is provided by Helmholtz coils 8. Two crossed polarizers, front polarizer 4 and rear polarizer 6 are placed at the entrance and exit of the cell as shown in FIG. 1. The magnetic field is oriented transversely to the optical axis of the filter and 45° to the direction of both polarizers. For light traveling along the optical axis, the vapor is effectively resonantly birefringent near absorption lines. We use the vapor as if it was a resonant half wave plate to obtain an ultra-narrow passband optical transmission filter. The transmission spectrum (in the range of 852 nm) of a Voigt filter built by the applicants is shown in FIG. 2. A passband occurs on either side of a strong absorption line. In cesium's case, there are two closely spaced absorption lines, resulting in four passbands. These are about 0.035 Å(i.e. less than 500 MHz) wide as shown clearly in FIG. 2.

DESIGN CONSIDERATIONS

The operating parameters of a Voigt filter are: (1) the choice of alkali metal vapor, (2) the vapor density, (3) the cell length and (4) the magnetic field intensity. Any of the strong absorption lines characteristic of alkali metal vapors (Li, Na, K, Rb or Cs) will provide the required Voigt effect in the presence of a magnetic field. The operating parameters are chosen such that a phase retardance between electric field components along and perpendicular to the magnetic field of one half wave occurs just outside the absorption line, where transmission through the vapor cell is still high. In general, the retardance increases with density, length and magnetic field strength. As an example of suitable parameters, the cesium Voigt filter with the transmission spectrum shown in FIG. 2 had the following parameters: The cell was 2.5 cm along and was operated with a density of $14 * 10^{12}$ cm$-3$ (Cs-temperature of 100° C.) and a magnetic field of 100 gauss.

VAPOR CELL

The cell in this embodiment transmitted light along a pathlength of about 2.5 cm through the hot vapor. The vapor cell consists of an evacuated Pyrex cylinder loaded with a small amount of the alkali metal with entrance and exit windows. The cell also features a hollow stub at the cell center which acts as a reservoir and a cold finger. The cell is heated by a wrapping of heat tape around its middle. The vapor density in the cell is set by the coolest temperature in the cell interior which is made to occur at the cell stub. Heat is applied to the sides of the cell by the heat tape, while the cell stub is contacted to a heat sink to maintain it at a slightly cooler temperature than the rest of the cell. The cell temperature was regulated such that the desired temperature is achieved at the cold finger. To ensure that the windows are hotter than the stub, they were insulated from the ambient environment by an envelope of still air contained by a second set of windows.

MAGNET

The magnet supplied a transverse field of about 100 gauss in the volume of vapor traversed by the optical beam. Either a solenoid or a permanent magnet could be used. In this case, the transverse field was provided by a pair of coils wound on coaxial rings placed on either side of the vapor cell with a separation of about 2 inches. Each solenoid consists of about 50 loops wound around a 3 inch diameter spindle arranged in 10 loop layers. A current of about 10 amps provides a uniform field of about 100 gauss between the rings.

POLARIZERS

An entrance and exit polarizer is placed before and after the vapor cell, respectively. The polarizers are preferably sheet or calcite; we used sheet. The second polarizer is oriented at 90° to the first such that the polarizers are crossed.

ALIGNMENT

Figure 2:
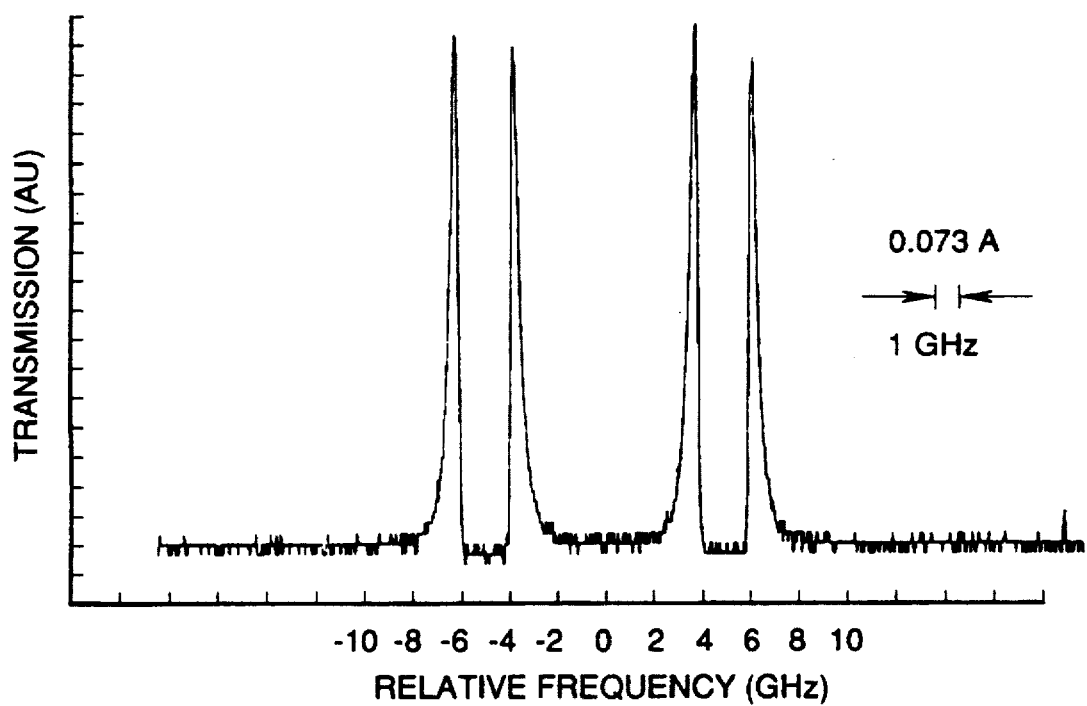
FIG. 2 is a transmission spectrum of the filter of FIG. 1 using Cs vapor.

The polarizer and magnet alignment is shown schematically in FIG. 1. Define the input polarization by the entrance polarizer to be, say, vertical. The exit polarizer is set to pass horizontal polarization, i.e. to cross the entrance polarizer. Then, the coils are placed such that their common axis lies in the plane perpendicular to the optical axis, at an angle of 45° with respect to the vertical.

OTHER EMBODIMENTS

Many alternative embodiments of the Voigt filter are available. Persons skilled in the art will recognize that vapors other than the Cs vapor used here will be suitable. Voigt filters can be designed using atomic and molecular vapors provided that they possess an adequate narrow absorption peak at practical temperatures and exhibit the Zeeman effect. The alkali metals, which include Li, Na, K, Rb, and Cs, and some alkaline earth metals such as Ca satisfy these criteria. Other candidates for vapors may include some transition metals and molecules. The required magnetic field may be generated by coils or permanent magnets. Any type of polarizer may be used, depending on the requirements of the optical design. Members of the two broad classes of sheet and crystal polarizers may be used. Generally, the sheet polarizers offer a wide field of view, but relatively low transmission and relatively poor extinction. Crystal polarizers, such as various calcite polarizers, offer high extinction ratios and transmission, but relatively narrow fields of view. A simple pyrex vapor cell enclosed with end caps of still air was the preferred embodiment. Other embodiments include the use of cells with evacuated end-caps or heatpipes.

LASER LOCKING

Figure 3:
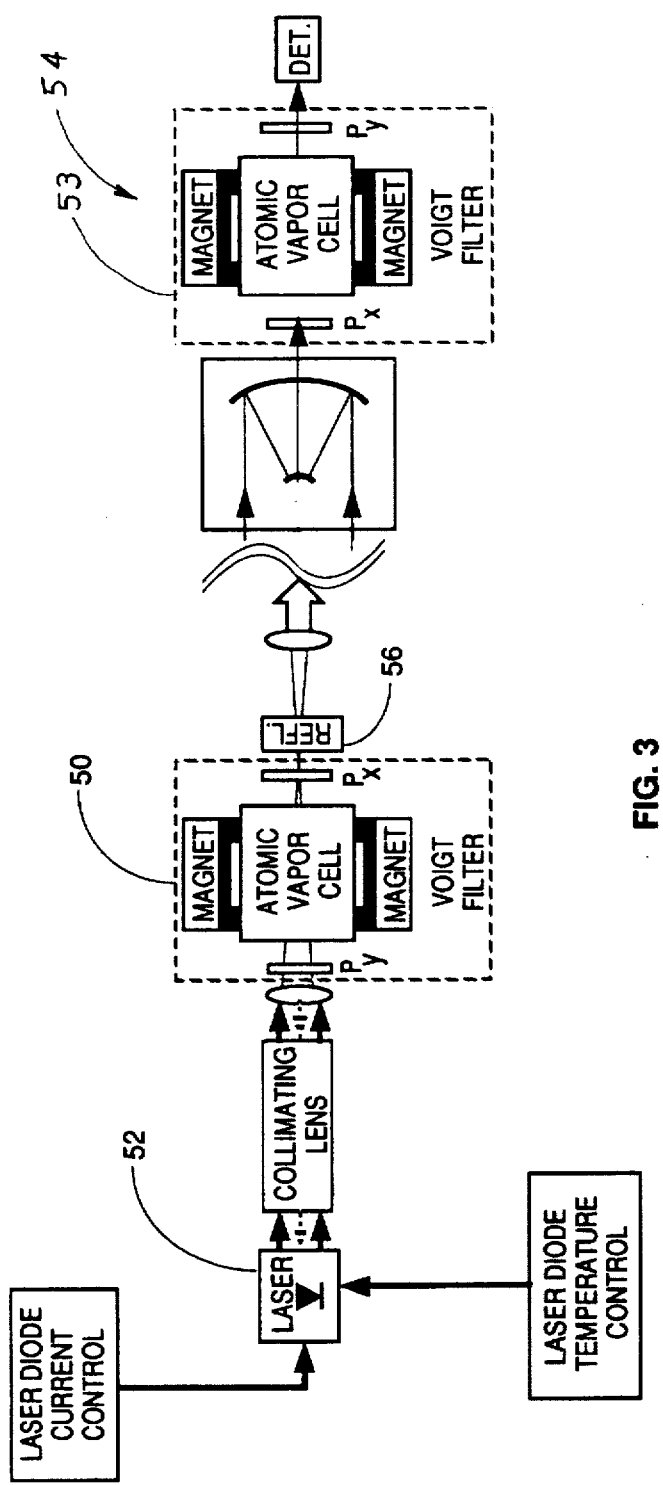
FIG. 3 is a schematic of a laser communication system comprising a frequency locked laser diode using a Voigt filter.
Figure 3A:
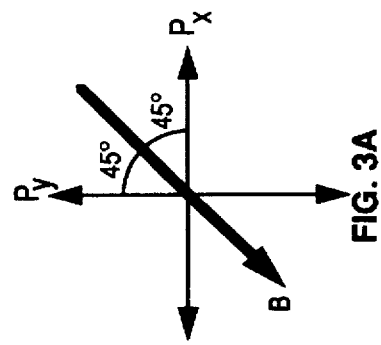
FIG. 3A shows the alignment of polarizers and magnetic field in the filters.

The inventors have built a prototype of a laser communication system using Voigt filters 1, a block diagram of which is shown in FIG. 3. To make use of the Voigt filter in an optical receiver, a laser transmitter emitting light at a Voigt filter passband is needed. We used one Voigt filter 50 to frequency lock a diode laser 52 at the required wavelength for a Voigt filter in an optical receiver 54 as is shown in FIG. 3. The diode laser is frequency locked using a "filtered feedback" approach, whereby feedback to the laser at the desired wavelength locks the laser emission to that wavelength. The laser beam is passed through the Voigt filter 50 to a partial reflector 56 that retroreflects about 10% of the filtered beam back into the laser. The diode laser, a single mode model designed to operate in the vicinity of the filter passband, then locks on one of the Voigt filter passbands. The particular passband is selected by fine turning the laser diode current. The laser beam is directed to a laser receiver system containing a similar Voigt filter 53 which is calibrated as indicated above to pass a very narrow band of light including the locked frequency.

While the above description describes specific embodiments of the present invention, the reader should not construe these as limitations on the scope of the invention but merely as examples. Accordingly the reader should determine the scope of the invention by the appended claims and not by the examples which have been given.

We claim:

1. A laser communication system comprising:
   a) a laser means for producing laser light at a frequency defining a nominal wavelength;
   b) a detector means, defining a field of view, for detecting light at said nominal wavelength;
   c) two Voigt optical filters for filtering light outside a narrowband of light surrounding and defining said nominal wavelength of light at or near the center of said narrowband, each filter comprising:
      1) a vapor cell containing a vapor capable of exhibiting a Zeeman effect in the range of said nominal wavelength and defining a cell axis and a cell entrance and a cell exit;
      2) a heating means—for maintaining said vapor at a desired temperature;
      3) a first polarizer positioned perpendicular to said cell axis and across and said cell entrance having a polarization direction defining a first polarizing direction;

4) a second polarizer positioned perpendicular to said cell axis and across said cell exit having a polarization direction defining a second polarizing direction and positioned such that said second polarization direction is approximately 90° offset from said first polarizing direction;

5) a magnetic field means for producing a magnetic field in a direction making angles of approximately 90° with said cell axis and 45° with each of said first and second polarization direction, wherein one of said two filters is installed in the path of said laser beam so as to frequency lock said laser and the other of said two filters is installed in the path of said laser beam in front of said detector so as to filter background light in the field of view of said detector.

* * * * *